United States Patent
Higaki et al.

(10) Patent No.: US 6,688,416 B2
(45) Date of Patent: Feb. 10, 2004

(54) WORKING VEHICLE WITH TRANSVERSE TRAVEL SYSTEM

(75) Inventors: Masami Higaki, Osaka (JP); Hiromi Ishida, Osaka (JP); Nobuo Masano, Osaka (JP); Seishi Morishita, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 10/204,791

(22) PCT Filed: Jun. 28, 2001

(86) PCT No.: PCT/JP01/05603

§ 371 (c)(1),
(2), (4) Date: Aug. 23, 2002

(87) PCT Pub. No.: WO02/051738

PCT Pub. Date: Jul. 4, 2002

(65) Prior Publication Data

US 2003/0029660 A1 Feb. 13, 2003

(30) Foreign Application Priority Data

Dec. 25, 2000 (JP) ........................ 2000-391736

(51) Int. Cl.⁷ .............................................. B60K 17/30
(52) U.S. Cl. ..................... 180/253; 180/252; 180/411
(58) Field of Search ............................... 180/411, 252, 180/253, 65.1, 65.5

(56) References Cited

U.S. PATENT DOCUMENTS

| | | | | |
|---|---|---|---|---|
| 4,823,899 A | | 4/1989 | Ron ........................... | 180/140 |
| 5,128,598 A | * | 7/1992 | Avitan ........................ | 318/587 |
| 5,699,873 A | * | 12/1997 | Moriya et al. .............. | 180/402 |
| 6,109,379 A | * | 8/2000 | Madwed ..................... | 180/65.5 |
| 6,367,571 B1 | * | 4/2002 | Schwarz ..................... | 180/253 |

FOREIGN PATENT DOCUMENTS

| | | |
|---|---|---|
| JP | 02-306879 | 12/1990 |
| JP | 05-246346 A | 9/1993 |
| JP | 10-244951 A | 9/1998 |

* cited by examiner

*Primary Examiner*—Lesley D. Morris
*Assistant Examiner*—L. Lum
(74) *Attorney, Agent, or Firm*—D. Peter Hochberg; Sean Mellino; Katherine R. Vieyra

(57) ABSTRACT

Front wheels (3) are attached to transmission devices (30) which are mounted to the vehicle body (2) to be rotatable around vertical axes (27), and rotating means (55) are provided between the side of the vehicle body (2) and the transmission devices (30), whereby the front wheels are steered to turn laterally at substantially right angles. An electric motor (40) is attached to the transmission device (30) to be located under the vertical axis (27). A case body (41) of the electric motor (40) is constructed by an outer case part (41A) and a non-loaded side bracket (41B), and a loaded side end portion of the outer case-part (41A) is connected to the transmission device case body (31). The drive shaft (44) is rotatably supported by the non-loaded side bracket (41B) at one end and by the transmission device case body (31) at the other end. A driving portion (34) provided at the other end side of the drive shaft (44) is operatively connected to an axle (28). As a result, a traveling drive device section can be constructed to be compact with assembling easiness.

2 Claims, 4 Drawing Sheets

WORKING VEHICLE WITH TRANSVERSE TRAVEL SYSTEM

TECHNICAL FIELD

The present invention relates to a working vehicle with a laterally traveling system which can switch the working vehicle to lateral traveling.

BACKGROUND ART

Conventionally, a self-propelled working truck which is found in Japanese Patent Unexamined Publication No. 2-306879 is proposed as a working vehicle that can be switched to lateral traveling.

In this conventional construction, on a bottom face of a frame, two drive wheels located on one diagonal line are provided via a direction turning shaft to be turnable, while two free idler wheels located on the other diagonal line are provided to be turnable, and both the drive wheels are operatively connected to each other by a direction changing connecting part. The connecting part is constructed by turning levers provided at a side of the direction turning shaft, a pair of rods connected to these turning levers at tip ends thereof, a hydraulic cylinder provided along the diagonal line on which both the drive wheels are located, and a connecting fining which is provided at an extendable rod of this hydraulic cylinder and which connects inner ends of the pair of rods.

The drive wheels are attached to support fittings via a drive shaft, and the support fitting is provided at the frame side via the direction turning shaft to be turnable. Further, a drive motor is provided at the support fitting, and a worm gear projected downward from the drive motor is meshed with a worm wheel of the drive shaft.

According to the conventional construction as described above, by extending and contracting the hydraulic cylinder, the rods are pushed and drawn along the diagonal line via the connecting fitting, whereby both the drive wheels can be turned in the opposite direction from each other via the turning levers and the direction turning shaft. The rotation of the drive motor is transmitted to the worm gear, worm wheel, and the drive shaft, whereby the drive wheels can be rotationally driven.

However in the above-described conventional construction, the drive motor (traveling drive device) is provided to the support fitting outside the turning axis, whereby the width of the drive wheel part which is turned becomes large, and therefore a large turning space has to be secured, thus making the width (length) of the vehicle body larger and increasing the size of the entire body. The drive motor and the like are independently constructed and thereafter installed, and thus the size of the entire body is increased.

DISCLOSURE OF INVENTION

The present invention has its object to provide a working vehicle with a laterally traveling system which is of a type capable of steering drive type front wheels to turn at substantially right angles in a lateral direction while a traveling drive device section is constructed to be compact with excellent assembling easiness.

In order to attain the above object, a working vehicle with a laterally traveling system of the present invention comprises a pair of left and right front wheels and a pair of left and right rear wheels mounted to a vehicle body to be turnable by 90 degrees, the pair of left and right front wheels being attached to transmission devices mounted to the vehicle body to be rotatable around vertical axes, rotating means provided between the vehicle body and the transmission devices, and a travel-driving electric motor located under the vertical axis and attached to each of the transmission devices, and is characterized in that each travel-driving electric motor has a case body comprising an outer case part and a non-loaded side bracket, the outer case part having a loaded side end portion connected to a case body of the transmission device, one end of a drive shaft mounted with a rotor is rotatably supported by the non-loaded side bracket, and the other end is rotatably supported by the case body of the transmission device, and the other end of the drive shaft is provided with a driving portion of the transmission device, which driving portion is operatively connected to an axle.

According to the invention with the above-described construction, the loaded side end portion of the outer case part in the case body of the electric motor is connected to the case body of the transmission device, and the other end of the drive shaft is rotatably supported at the case body of the transmission device, whereby the number of the components of the electric motor is reduced to be able to simplify the construction, and the section of the electric motor is improved in assembling easiness (mounting easiness), and can be constructed to be compact. In addition, the electric motor is located under the vertical axis, whereby the width of the turning front wheel part, namely, the space for turning can be made smaller, thus making it possible to reduce the width (length) of the vehicle body and downsize the entire body.

During normal traveling, the left and right front wheels and the left and right rear wheels face the longitudinal direction. When switching from the normal traveling to the laterally traveling, the rotating means are operated first to rotate the transmission devices around the vertical axes, whereby the front wheels can be turned by 90 degrees (turned laterally at substantially right angles) with respect to the vehicle body. Here, the electric motors and the front wheels are located under the vertical axes, whereby turning of the electric motors, the front wheels and the like by 90 degrees is performed easily, smoothly and compactly. After the drive type front wheels are turned laterally at substantially right angles (steered), the front wheels are driven in the normal and reverse direction by the electric motors, whereby the working vehicle can laterally travel either to the left or right.

The preferred embodiment in the working vehicle with the laterally traveling system of the present invention is characterized in that the mast is disposed at the front end side of the vehicle body, and forks are attached to the mast.

According to this embodiment, during normal traveling, the left and right front wheels and the left and right rear wheels face the longitudinal direction, and by manipulating the lever for the lift, the fork is hoisted and lowered along the mast to perform a fork operation for a predetermined period of time. While it is of the type which enables a normal fork operation like this, it steers the drive type front wheels to face laterally at substantially right angles to make it possible to perform lateral traveling, and for example, an elongate object can be transported easily via the forks.

BEST MODE FOR CARRYING OUT THE INVENTION

Figure 2:
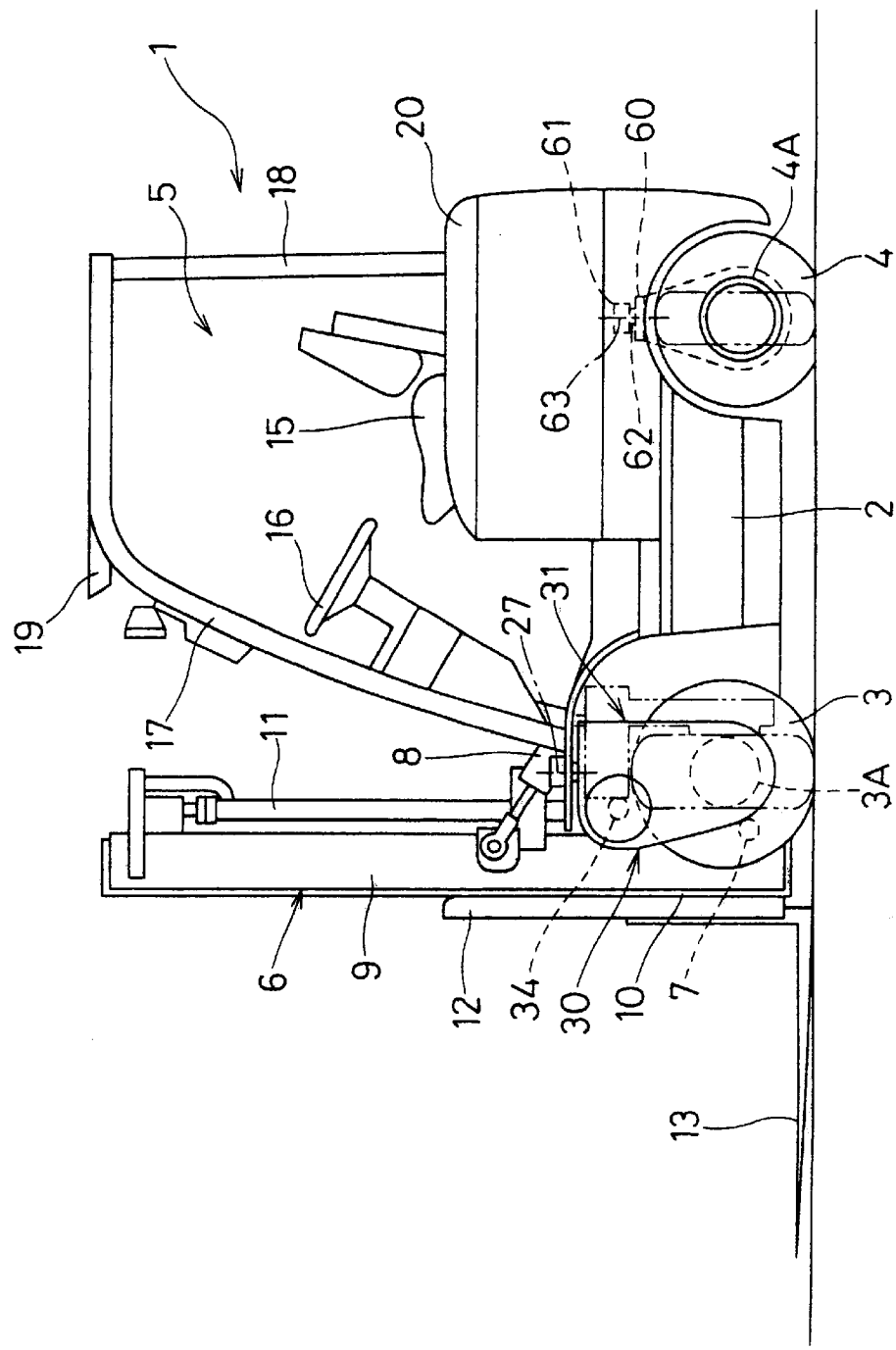
FIG. 2 is a side view of the working vehicle with the same laterally traveling system during normal traveling.
Figure 3:
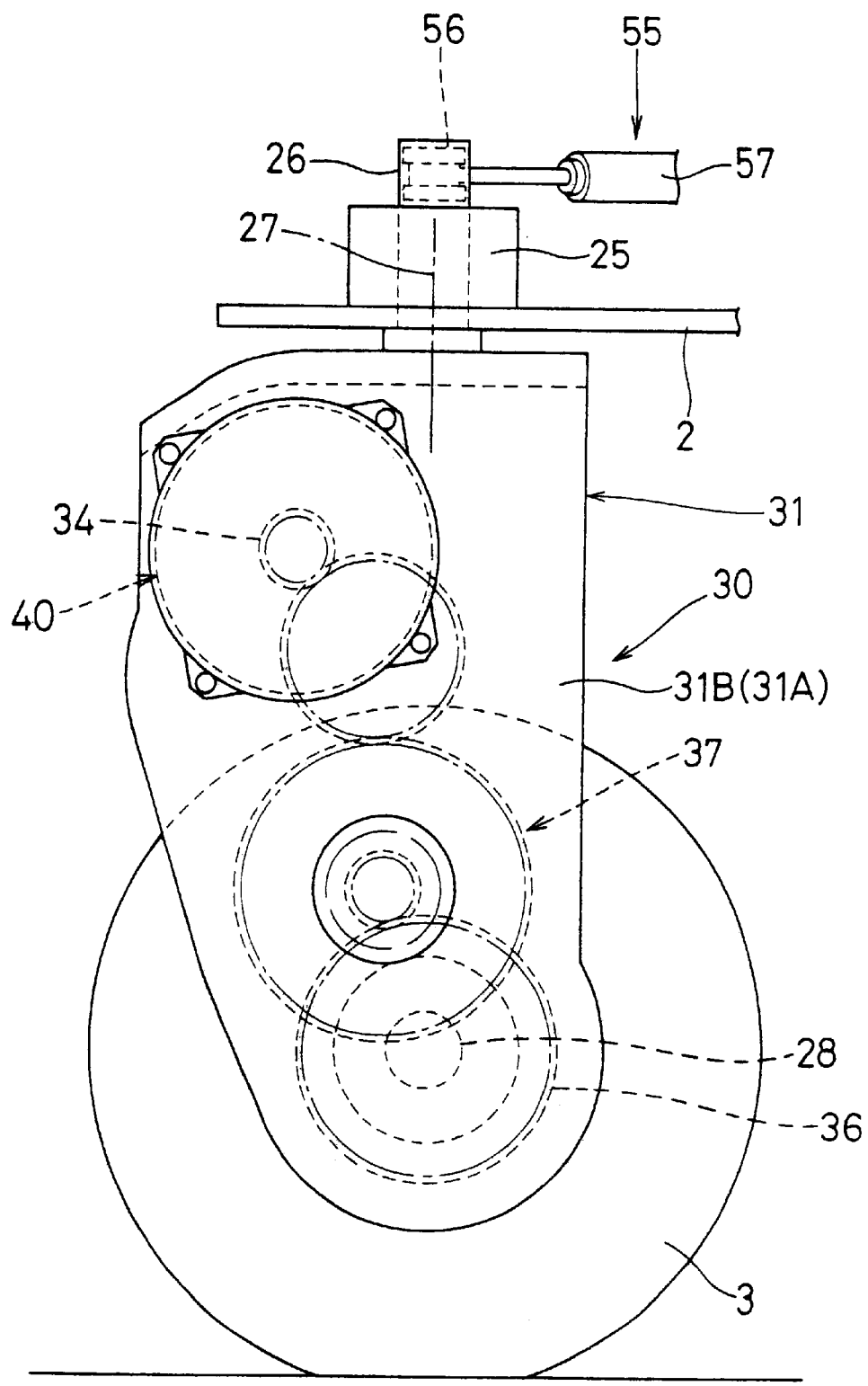
FIG. 3 is a side view of the front wheel part of the working vehicle with the same laterally traveling system.

An embodiment of the present invention will be explained below based on the drawings. In FIG. 2, a fork lift 1 as an example of a working vehicle is provided with a pair of left and right front wheels (drive wheels) 3 to a front portion of a vehicle body 2, a pair of left and right rear wheels (idler wheels) 4 to a rear portion thereof, and a driver's seat 5 above the front portion of the vehicle body 2. A vertically extendable mast 6 is disposed at the front end section of the aforementioned vehicle body 2 to be rotatable in a longitudinal direction via a connecting shaft 7 in a vehicle width direction, a tilt cylinder 8 which effects the longitudinal rotation is provided between the vehicle body 2 and the mast 6.

The mast 6 is constructed by a pair of left and right outer frames 9 at a side of the fork lift 1, and a pair of left and right inner frames 10 descendable and ascendable by being guided by the outer frames 9, and a lift cylinder 11 is provided between the outer frame 9 and the inner frame 10. A lift bracket 12 is provided to be capable of vertically moving by being guided on the inner frame 10, and a pair of left and right forks 13 are attached to the lift bracket 12 via a pair of vertical finger bars.

The driver's seat 5 is provided with a seat 15, a steering wheel 16 located in front of the seat 15 and the like, and a head guard 19 is provided thereabove via a front pipe 17 and a rear pipe 18 which are erected from the vehicle body 2. Further, a counterweight 20 is provided at a back of the seat 15 on the vehicle body 2.

In FIG. 1 to FIG. 4, the pair of left and right front wheels 3 and the pair of the left and right rear wheels 4 are mounted to the vehicle body 2 so that they can be turned by 90 degrees (laterally turnable at substantially right angles). Namely, on both sides of the front portion of the vehicle body 2, vertical shafts 26 are provided to be rotatable around vertical axes 27 via the respective bearings 25. A transmission device case body 31 of a transmission device 30 is fixed at a lower end of the vertical axis 27, whereby the transmission device 30 is mounted to the vehicle body 2 to be rotatable around the vertical axis 27.

Here, the transmission device case body 31 is constructed by an inner case part 31A in an inverted L-shape, and an outer case part 31B attached to an outer face side of a vertical plate portion in this inner case part 31A, and a lateral plate portion of the inner case part 31A is fixed at a lower end of the vertical axis 26.

In the upper part of the transmission device case body 31, an oil seal 32 can be placed in a penetrated portion formed in the inner case part 31A, and a bearing 33 can be placed in a recessed portion formed in the outer case part 31B. A cylindrical driving gear (driving portion) 34 is rotatably supported by this bearing 33 via a cylindrical boss portion 34a.

Further, an axle 28 is rotatably provided via a wheel bearing 35 at the inner case part 31A in the lower part of the transmission device case body 31, a driven gear (driven part) 36 is attached to the axle 28 to be located inside the transmission device case body 31, a rim 3A of the front wheel 3 is detachably attached to a part projected to the outside of the transmission device case body 31 via a rotational flange 29 and the like. The driving gear 34 and the driven gear 36 are operatively connected via a reduction gear mechanism 37 located inside the transmission device case body 31. An example of the transmission device 30 is constructed by the above-described components 31 to 37.

An electric motor 40 for traveling drive that is located below the vertical axis 27 is attached to the transmission device 30. Namely, a case body 41 of the electric motor 40 is constructed by a cylindrical outer case part 41A, and a non-loaded side bracket 41B which blocks a non-loaded side end portion (non-loaded side end) of the outer case part 41A, and a loaded side end portion of the outer case part 41A is integrated with a inner face side of the vertical plate portion of the inner case part 31A in the transmission device case body 31 by welding or the like. As a result, the inner case part 31A of the transmission device case body 31 is also used as a loaded side end bracket in the electric motor 40.

A stator component such as a stator 42 is provided on an inner circumferential face of the outer case part 41A. The drive shaft 44 mounted with a rotor 43 is placed inside the case body 41, and one end of the drive shaft 44 is rotatably supported at a bearing 45 in a recessed portion formed in the non-loaded side bracket 41B. The other end of the drive shaft 44 is inserted through the driving gear 34 and connected therewith.

As a result, the other end of the drive shaft 44 is rotatably supported at the outer case part 31B of the transmission device case body 31 via the cylindrical boss part 34a of the driving gear 34 and the bearing 33. The driving gear 34 provided at the other end of the drive shaft 44 is operatively connected to the axle 28 via the reduction gear mechanism 37 and the driven gear 36, whereby the pair of left and right front wheels 3 are operatively connected to the respective drive shafts 44 of the electric motors 40. On this occasion, the front wheel 3 is constructed to be located at an area immediately below the vertical axis 27. An example of the electric motor 40 is constructed by the above-described components 41 to 45 and the like.

A battery 50 is mounted on the vehicle body 2, and a controller 51 is attached to the battery 50. A cable 52 from the controller 51 is connected to each of the electric motors 40.

Front wheel rotating means 55 for rotating the left and right transmission devices 30 are provided. Namely, a turning cylinder 57 is provided to be relatively rotatable between a link 56 provided at an upper end portion of the vertical shafts 26 and the vehicle body 2, whereby the left and right front wheels 3 are constructed to turn in opposite directions from each other to face laterally at substantially right angles, by extension movement of the turning cylinder 57. An example of the front wheel rotating means 55 is constructed by the above-described components 56, 57 and the like.

In each of the pair of left and right rear wheels 4, a rim 4A is attached to a vertical plate portion in a turning member 60 via an axle and the like to be freely rotatable, and a lateral plate portion in the turning member 60 is attached to the vehicle body 2 to be rotatable around a vertical axis 63 via a wheel bearing 61 and a vertical shaft 62. In this situation, the rear wheel 4 is constructed to be located at an area immediately below the vertical axis 63.

Rear wheel rotating means 65 for rotating the left and right turning members 60 is provided. Namely, free ends of links 66 provided at upper end portions of the vertical shafts 62 are connected by a common link 67 in a vehicle width direction, and a turning cylinder 68 is provided between a middle portion of the common link 67 and the vehicle body 2 to be relatively rotatable. Accordingly, the left and right front wheels 3 are constructed to be turned in the same direction to face laterally at substantially right angles by extension movement of the turning cylinder 68. An example of the rear wheel rotating means 65 is constructed by the above-described components 66 to 68 and the like.

An operation in the above-described embodiment will be explained below.

In the electric motor 40 section, a loaded side end portion of the outer case part 41A in the case body 41 is directly connected to the inner case part 31A of the transmission device case body 31, and the other end of the drive shaft 44 is rotatably supported by the outer case part 31B of the transmission device case body 31, whereby the electric motor 40 section can be constructed to be compact with excellent assembling easiness. In addition, the electric motor 40 is located under the vertical axis 27, whereby the width of the front wheel part which is turned, namely, the space for turning can be made smaller, and the width of the vehicle body 2 (length) is decreased, thus making it possible to reduce the entire body in size.

Figure 1:
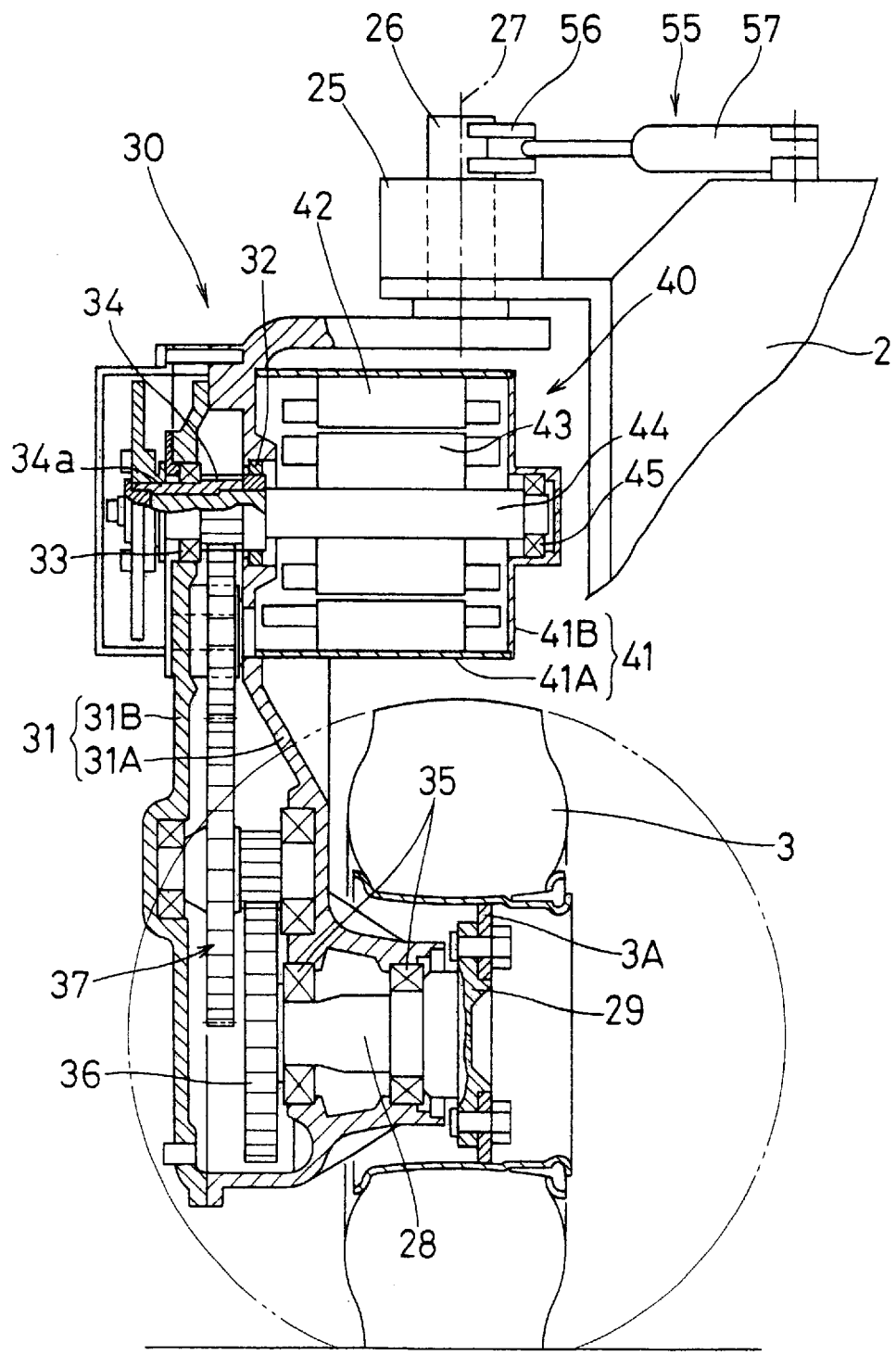
FIG. 1 shows an embodiment of the present invention, and is a partially cutaway front view of a front wheel part of a working vehicle with a laterally traveling system.
Figure 4:
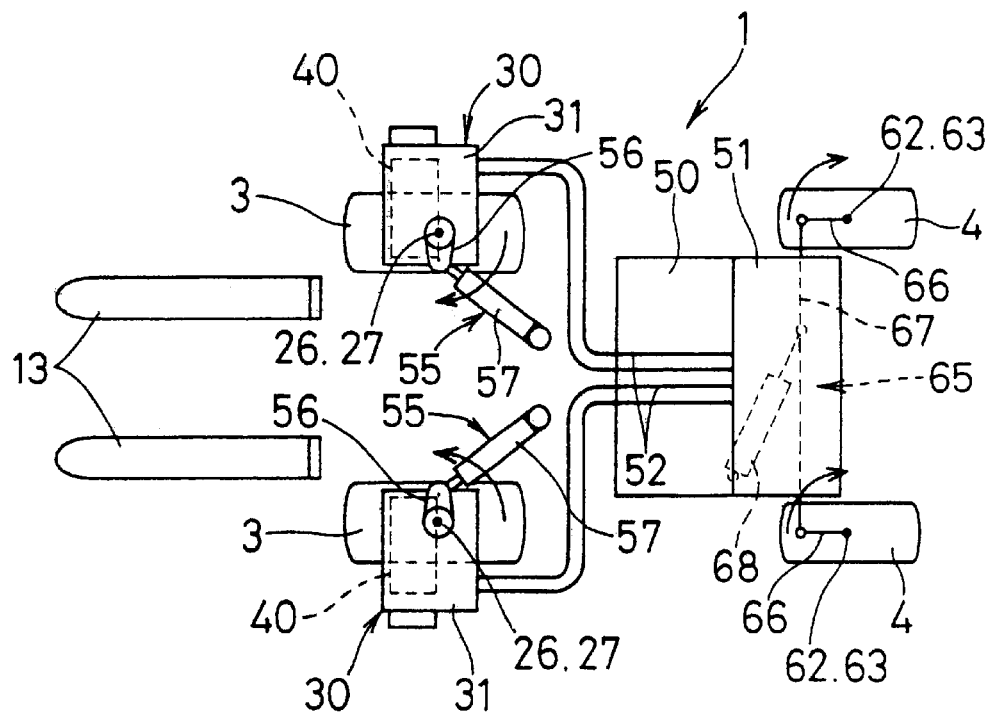
FIG. 4 is a schematic plan view of the working vehicle with the same laterally traveling system during normal traveling.

The solid lines in FIG. 1 and FIG. 2, and FIG. 4 show situations at the time of normal traveling. In these situations, the left and right front wheels 3 and the left and right rear wheels 4 face the longitudinal direction. The fork lift 1 like this can travel by operation of the steering wheel 16 by the operator seated in the seat 15 of the driver's seat 5. Namely, electric power of the battery 50 is controlled by the controller 51, and thereafter it is supplied to the electric motors 40 via the cable 52, whereby the front wheels 3 are driven in a normal and reverse direction and the fork lift 1 can travel in a longitudinal direction.

The lift cylinder 11 is operated by manipulating the lift lever, whereby the fork 13 can be hoisted and lowered along the mast 6 via the lift bracket 12 and the like, thus making it possible to perform a fork operation for a predetermined period of time. The tilt cylinder 8 is operated by manipulating the tilt lever, whereby the mast 6 can be rotated (tilted) around the connecting shaft 7, thus making it possible to change the posture of the fork 13 via the lift bracket 12 and the like.

When switching from the normal traveling as described above to lateral traveling, the front wheel rotating means 55 and the rear wheel rotating means 65 are operated by manipulating a lever type lateral mode switch (not shown) at first to tilt the lever.

Figure 5:
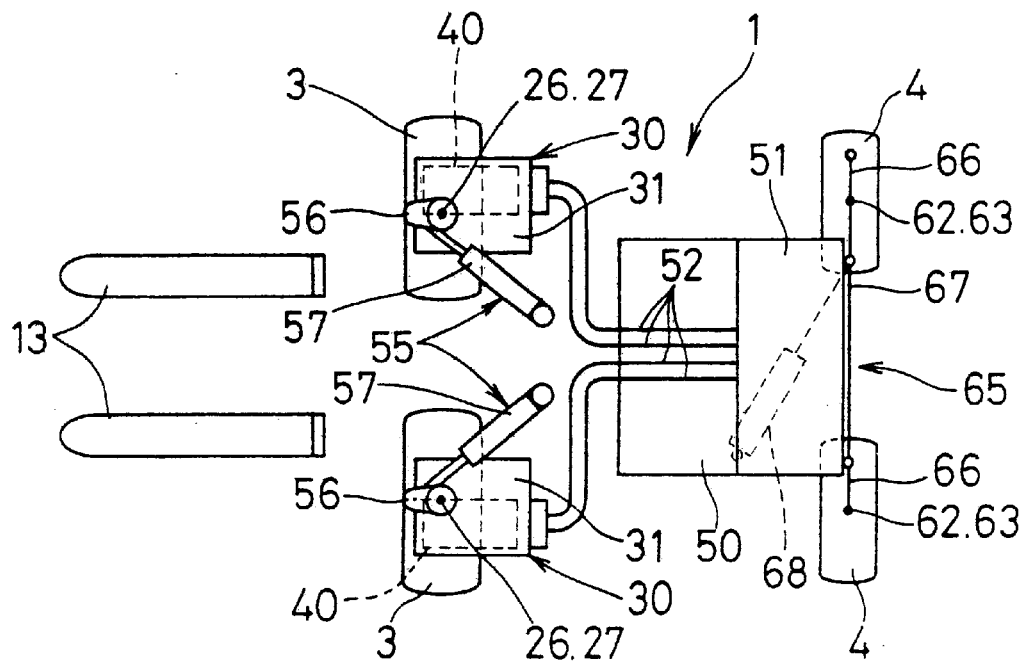
FIG. 5 is a schematic plan view of the working vehicle with the same laterally traveling system during lateral traveling.

Namely, both the turning cylinders 57 of the front wheel rotating means 55 are synchronized and extended, and the transmission devices 30 are rotated in a reverse direction around the vertical axes 27 via the links 56, whereby the front wheels 3 are turned by 90 degrees with respect to the vehicle body 2 (laterally turned at substantially right angles) as shown by the phantom lines in FIG. 1 and FIG. 2, and FIG. 5.

Since the electric motors 40 and the front wheels 3 are located under the vertical axes 27 in this situation, the electric motors 40, the front wheels 3 and the like can be turned to 90 degrees easily, smoothly, and compactly.

Further, the turning cylinder 68 of the rear wheel rotating means 65 is extensively moved, and the turning members 60 are rotated in the same direction around the vertical axes 63 via the common link 67 and the links 66, whereby the rear wheels 4 are turned by 90 degrees (laterally turned at substantially right angles) with respect to the vehicle body 2 as shown by the phantom lines in FIG. 1 and FIG. 2, and FIG. 5. Since the rear wheels 4 are located under the vertical axes 63, the rear wheels 4 and the like are made compact and can be turned by 90 degrees.

The turning of the front wheels 3 and the rear wheels 4 as described above, namely, turning the front wheels 3 and the rear wheels 4 laterally at substantially right angles is sensed by the sensor, and an indicator lamp is lit, whereby a laterally traveling mode is made possible. Accordingly, electric power of the battery 50 is controlled by the controller 51 and thereafter it is supplied to both the electric motors 40 via the cable 52, whereby the front wheels 3 are driven in the normal and reverse direction, thus making it possible to make the fork lift 1 travel laterally on the left and right. In this situation, the pair of left and right rear wheels 4 perform slave rotation.

As a result that lateral traveling can be performed as described above, for example, an elongate object can be transported easily via the fork 13. Compensation of straightness in lateral traveling is facilitated by tilting the lever longitudinally to operate the turning cylinder 57 slightly to perform fine tuning of the angles of the front wheels 3, or by operating the turning cylinder 68 slightly to perform fine tuning of the angles of the rear wheels 4.

In the above-described embodiment, a counter type fork lift 1 is shown as a working vehicle, but the same operation can be obtained if a large-scale transporter, a loader, a side fork lift and the like are used as the working vehicle.

In the above-described embodiment, the cylindrical driving gear 34 is adopted as the drive part to make a type in which the drive shaft 44 is linked with the driving gear 34, but this may be a drive part of a type in which a driving gear is directly formed at the other end of the drive shaft 44. In this case, the number of the components of the transmission device 30 can be reduced and the construction can be further simplified.

In the above-described embodiment, a type in which the pair of left and right rear wheels 4 are forcibly turned by the rear wheel rotating means 65 is adopted, but a turning caster type which is turned by following may be adopted. Out of the pair of left and right rear wheels 4, one of the rear wheels 4 may be a steering type by a handle wheel, and the other one of the rear wheels 4 may be a turning caster type, and in this case, when switching to lateral traveling, the one of the rear wheels 4 is forcibly turned by the cylinder and the like.

In the above-described embodiment, a type in which the pair of left and right front wheels 3 are independently rotated by the respective front wheel rotating means 55 is shown, but this may be a type in which common front wheel rotating means for simultaneously rotating the pair of left and right front wheels 3 is provided.

What is claimed is:

1. A working vehicle with a laterally traveling system, comprising:

a pair of transmission devices, each transmission device having a case body and a driving portion;

a pair of front wheels and a pair of rear wheels all mounted to a vehicle body to be turnable at substantially right angles, the pair of front wheels each being attached to one of said transmission devices mounted to the vehicle body, each front wheel being rotatable around a vertical axis;

rotating means provided between the vehicle body and the transmission devices; and an electric motor located in the path of the vertical axis of each front wheel, each motor attached to one of the transmission devices, wherein:

each electric motor has a motor case body comprising an outer case part and a non-loaded side bracket, the outer case part having a loaded side end portion connected to the case body of the transmission device;

one end of a drive shaft mounted with a rotor is rotatably supported by the non-loaded side bracket and the other end of the drive shaft is rotatably supported by the case body of the transmission device; and the other end of the drive shaft is provided with the driving portion of the transmission device, the driving portion being operatively connected to an axle.

2. The working vehicle with the laterally traveling system according to claim 1, and further comprising a mast disposed at a front end side of the vehicle body, and forks attached to the mast.

* * * * *